United States Patent
Takemoto et al.

(10) Patent No.: US 8,616,669 B2
(45) Date of Patent: Dec. 31, 2013

(54) CONTROL DEVICE, METHOD AND PROGRAM FOR MANUFACTURING TRANSFER MEDIUM

(75) Inventors: Kiyohiko Takemoto, Nagano (JP); Kazuaki Tsukiana, Nagano (JP); Masakazu Ohashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/479,891

(22) Filed: May 24, 2012

(65) Prior Publication Data

US 2012/0299988 A1 Nov. 29, 2012

(30) Foreign Application Priority Data

May 26, 2011 (JP) ................. 2011-117687

(51) Int. Cl.
*B41J 2/205* (2006.01)
(52) U.S. Cl.
USPC ............................................. 347/15
(58) Field of Classification Search
CPC .................................... B41J 2/2114
USPC .................... 347/6, 14, 15, 96, 103
See application file for complete search history.

(56) References Cited

U.S. PATENT DOCUMENTS 8,035,854 B2 * 10/2011 Watanabe ............ 358/1.9
8,500,269 B2 * 8/2013 Morita ................ 347/103

FOREIGN PATENT DOCUMENTS

JP          07-314879 A     12/1995

* cited by examiner

*Primary Examiner* — An Do
(74) *Attorney, Agent, or Firm* — Global IP Counselors, LLP

(57) ABSTRACT

A control device is adapted to control a recording device provided with a nozzle for discharging a color ink and a nozzle for discharging an adhesive fluid. The control device is configured to generate color image data representing a color image made up from color dots formed by the color ink, to generate adhesion image data representing an adhesion image made up from adhesion dots, which are dots formed by the adhesive fluid, wherein the adhesion image data is generated such that the adhesion dots are arranged so that the adhesive fluid is applied at an amount that corresponds to the amount of the color ink applied per unit area and the adhesion dots are arranged so that, when the amount of the color ink applied per unit area is zero, the amount of the adhesive fluid applied differs between inside and outside of a region of the adhesion image.

7 Claims, 18 Drawing Sheets

(FOR COMPARISON)

(PRESENT EMBODIMENT)

(FOR COMPARISON)

(PRESENT EMBODIMENT)

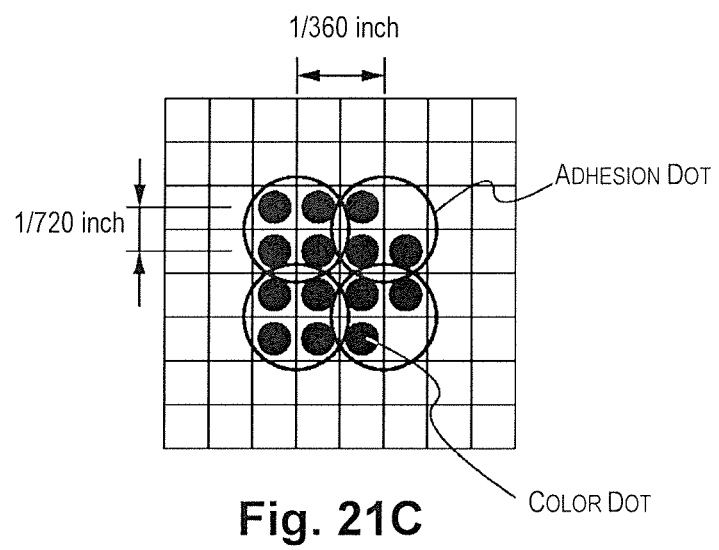

CONTROL DEVICE, METHOD AND PROGRAM FOR MANUFACTURING TRANSFER MEDIUM

CROSS-REFERENCE TO RELATED APPLICATIONS

This application claims priority to Japanese Patent Application No. 2011-117687 filed on May 26, 2011. The entire disclosure of Japanese Patent Application No. 2011-117687 is hereby incorporated herein by reference.

BACKGROUND

1. Technical Field

The present invention relates to a control device and a method and a program for manufacturing a transfer medium.

2. Related Art

Conventionally, there are known transfer mediums for transferring, to a transfer target medium, characters and other image patterns formed by causing ink to adhere onto a base material. In relation to such transfer mediums, there are known techniques for using, e.g., a screen printing plate to coat the pattern with an adhesive fluid to match the pattern profile, such as that described in Japanese Laid-Open Patent Application Publication No. 7-314879.

SUMMARY

In a case in which, other than a screen printing plate, a flexo, gravure, or another printing plate is used to form an image pattern or an adhesive fluid pattern, small-quantity diverse-type production of the transfer medium is unsuitable due to the high cost of plate making. Therefore, in order to minimize production cost in small-quantity diverse-type production of the transfer medium, a possible method is to cause an ink and an adhesive fluid to be discharged from a inkjet head and be adhered to a base material, whereby a coloring layer and an adhesion layer are sequentially formed on the base material and the transfer medium is formed.

A color image formed using the inkjet method is made up from a large number of color dots. The color dots are therefore arranged in a dispersed manner in regions where the image is lighter. Therefore, when a transfer medium is being manufactured using the inkjet method, there is a need to apply the adhesive fluid so that dots that have been dispersedly arranged can also be transferred onto the transfer target medium. There is therefore a need to apply the adhesive fluid even in lighter regions in which color dots that are formed are almost absent.

An issue here is whether or not to apply the adhesive fluid to a region in which no color dots are formed (i.e., a region in which the amount of color ink applied per unit area is zero). If no adhesive fluid is applied to all regions in which no color dots are formed, there is a risk of the glossiness of the image transferred onto the transfer target medium becoming uneven. If, on the other hand, a predetermined amount of the adhesive fluid is applied to all regions in which no color dots are formed, the consumption of the adhesive fluid increases, raising the cost.

An object of the present invention is to minimize consumption of the adhesive fluid while enhancing the image quality of a transferred image.

A control device according to one aspect of the present invention is adapted to control a recording device provided with a nozzle for discharging a color ink and a nozzle for discharging an adhesive fluid. The control device includes a color image data generating part and an adhesion image data generating part. The color image data generating part is configured to generate color image data representing a color image made up from color dots formed by the color ink. The adhesion image data generating part is configured to generate adhesion image data representing an adhesion image made up from adhesion dots formed by the adhesive fluid, the adhesion image data being generated such that the adhesion dots are arranged so that the adhesive fluid is applied at an amount that corresponds to an amount of the color ink applied per unit area and the adhesion dots are arranged so that, when the amount of the color ink applied per unit area is zero, the amount of the adhesive fluid applied differs between inside and outside of a region of the adhesion image.

Other characteristics of the present invention shall be revealed from the present specification and the accompanying drawings.

BRIEF DESCRIPTION OF THE DRAWINGS

Referring now to the attached drawings which form a part of this original disclosure:

FIG. 15C is an illustrative drawing used for comparison, and illustrates a case in which no adhesion dots have been added in the aforementioned S105 (see also FIG. 10A), and FIG. 15D illustrates the present embodiment, and illustrates a state in which the adhesion dots have been added in S105 (see also FIG. 10B);

FIGS. 21A to 21C illustrate the resolution of the color image and the resolution of the adhesion image.

DETAILED DESCRIPTION OF EXEMPLARY EMBODIMENTS

Figure 1A:
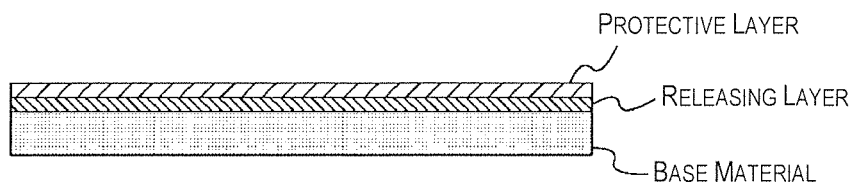
FIG. 1A illustrates the configuration of the base material.

At least the following items are revealed from the present specifications and the accompanying drawings.

A control device according to one embodiment of the present invention is adapted to control a recording device provided with a nozzle for discharging a color ink and a nozzle for discharging an adhesive fluid. The control device includes a color image data generating part and an adhesion image data generating part. The color image data generating part is configured to generate color image data representing a color image made up from color dots formed by the color ink. The adhesion image data generating part is configured to generate adhesion image data representing an adhesion image made up from adhesion dots formed by the adhesive fluid, the adhesion image data being generated such that the adhesion dots are arranged so that the adhesive fluid is applied at an amount that corresponds to an amount of the color ink applied per unit area and the adhesion dots are arranged so that, when the amount of the color ink applied per unit area is zero, the amount of the adhesive fluid applied differs between inside and outside of a region of the adhesion image.

According to a control device of such description, it is possible to control the recording device so as to minimize consumption of the adhesive fluid while enhancing the image quality of a transferred image.

Preferably, the recording device causes the color dots to be formed on a base material according to the color image data, and causes the adhesion dots to be formed on the base material according to the adhesion image data, whereby the recording device causes a transfer medium to be manufactured. Using a transfer medium of such description enhances the image quality of the transferred image.

Preferably, the adhesion image data generating part is configured to use the color image data as a basis and to further add a pixel, in which a dot is to be formed, to generate the adhesion image data. An adhesion dot is thereby inevitably formed on a pixel in which a color dot is formed.

Preferably, the adhesion image data generating part is configured to generate the adhesion image data so that, inside the region of the adhesion image, a proportion of the amount of the adhesive fluid applied relative to the amount of the color ink applied increases as the amount of the color ink applied per unit area decreases. It is thereby possible to make the surface of the transfer medium as smooth as possible and enhance transferring performance.

Preferably, the region of the adhesion image is set to a larger range than a region of the color image. The transfer performance of the color image is thereby enhanced.

A method for manufacturing a transfer medium according to one embodiment of the present invention includes: generating color image data representing a color image made up from color dots formed by color ink; and generating adhesion image data representing an adhesion image made up from adhesion dots formed by an adhesive fluid, the adhesion dots being arranged so that the adhesive fluid is applied at an amount that corresponds to the amount of the color ink applied per unit area and the adhesion dots are arranged so that, when the amount of the color ink applied per unit area is zero, the amount of the adhesive fluid applied differs between inside and outside of a region of the adhesion image.

According to a method for manufacturing a transfer medium of such description, it is possible to minimize consumption of the adhesive fluid while enhancing the image quality of the transferred image.

A non-transitory computer-readable storage medium according to one embodiment of the present invention has stored thereon instructions executable by a computer to control a device, which applies a color ink and an adhesive fluid to a base material and manufactures a transfer medium, to perform a method for manufacturing a transfer medium including: generating color image data representing a color image made up from color dots formed by color ink; and generating adhesion image data representing an adhesion image made up from adhesion dots formed by an adhesive fluid, the adhesion dots being arranged so that the adhesive fluid is applied at an amount that corresponds to the amount of the color ink applied per unit area and the adhesion dots are arranged so that, when the amount of the color ink applied per unit area is zero, the amount of the adhesive fluid applied differs between inside and outside of a region of the adhesion image.

According to a program of such description, it is possible to minimize consumption of the adhesive fluid while enhancing the image quality of the transferred image.

Basic Structure of Transfer Medium

First, the structure of the transfer medium will be briefly described. The basic structure will be described.

In the present specification, a "transfer medium" refers to a medium from which a transfer is performed onto a transfer target medium. The transfer medium is a medium including at least a base material, a coloring layer, and an adhesion layer. A transfer target medium refers to a medium onto which at least the coloring layer and the adhesion layer are transferred from the transfer medium, i.e., a target.

FIG. 1A illustrates a basic configuration of the base material. The base material has a sheet-like or a film-like shape. "Base material" refers to a support body used to transfer a pattern on the coloring layer and the adhesion layer. Here, a PET film having a thickness of 25 μm is used as the base material. However, the material forming the base material is not limited to that described; for example, another plastic, metal, wood, paper, or another material may also be used.

As shown in FIG. 1A, a releasing layer and a protective layer are formed in advance on a surface of the base material. The releasing layer is a layer for raising the transfer performance (foil-cutting performance) with regards to a transfer from the transfer medium to the transfer target medium. The releasing layer in this instance is a layer obtained by drying a polyethylene-wax-based releasing agent. However, the releasing layer is not limited to that described; for example, a silicone-based releasing agent, a fluorine-based releasing agent, or a similar releasing agent may also be used. The protective layer is a layer for raising the scratch resistance of the coloring layer transferred onto the transfer target medium.

The releasing layer and the protective layer are formed in advance on the surface of the base material. However, this is not provided by way of limitation. For example, the releasing layer and the protective layer may be formed by a recording device (transfer medium manufacturing device) described further below. The releasing layer and the protective layer may be absent from the surface of the base material if it is possible to obtain transfer performance (foil-cutting performance) with regards to a transfer from the transfer medium to the transfer target medium, scratch resistance with regards to the transferred coloring layer, and similar properties.

Figure 1B:
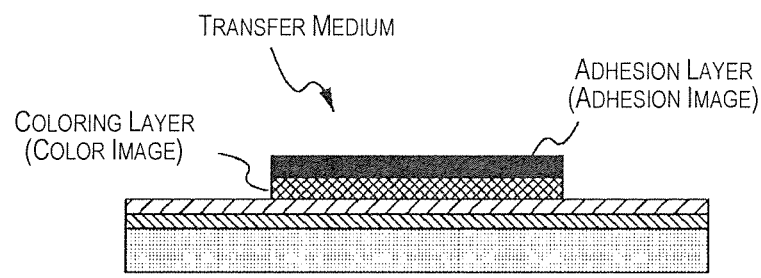
FIG. 1B illustrates a coloring layer and an adhesion layer formed on the surface of the base material.

FIG. 1B illustrates the coloring layer and the adhesion layer formed on the surface of the base material.

The coloring layer is a layer making up the color image. The coloring layer is formed by applying a color ink (cyan ink, magenta ink, yellow ink, black ink, etc.) onto the surface of the base material. The coloring layer in the drawing is formed on the transfer medium above the protective layer (above the base material).

The adhesion layer is a layer for causing the coloring layer and the like to adhere to the transfer target medium. The adhesion layer is formed by applying an adhesive fluid. The adhesion layer in the drawing is formed above the coloring layer. For example, a water-based liquid including a thermoplastic resin in an emulsion format is used as the adhesive fluid. The adhesion layer formed by applying and subsequently drying the adhesive fluid is in a state in which the adhesive strength is weak at this stage. Therefore, it is possible, after the transfer medium has been manufactured, to wind the transfer medium so that the adhesion layer comes into contact with a reverse surface of the base material. The adhesion layer gains adhesive property by being heated after transfer.

In the drawing, each of the coloring layer and the adhesion layer is depicted so as to be clearly separate. However, in actual practice, each of the layers is not necessarily clearly separate. For example, if the adhesive fluid forming the adhesion layer is applied before the color ink forming the coloring layer has sufficiently dried, the color ink and the adhesive fluid may partially mix.

The illustrative diagram shown in FIG. 1B also shows the sequence of a procedure for manufacturing the transfer medium. For example, it is shown that in the instance of the transfer medium shown in the drawing, the color ink for forming the coloring layer is first applied on the base material (protective layer), and an adhesive for forming the adhesion layer is next applied, whereby the transfer medium is manufactured.

In a case in which each of the layers are formed using the inkjet method, the result is not necessarily the layered structure having a sequence shown in the drawing. For example, in a case in which the color image of the coloring layer is a light image, dots formed by the color ink (i.e., color dots) are dispersed. There are thus gaps between the color dots. Therefore, even when the description in the present specification is given using the term "layer", there may be gaps in the layer corresponding to the content of an image forming the layer.

Figure 1C:
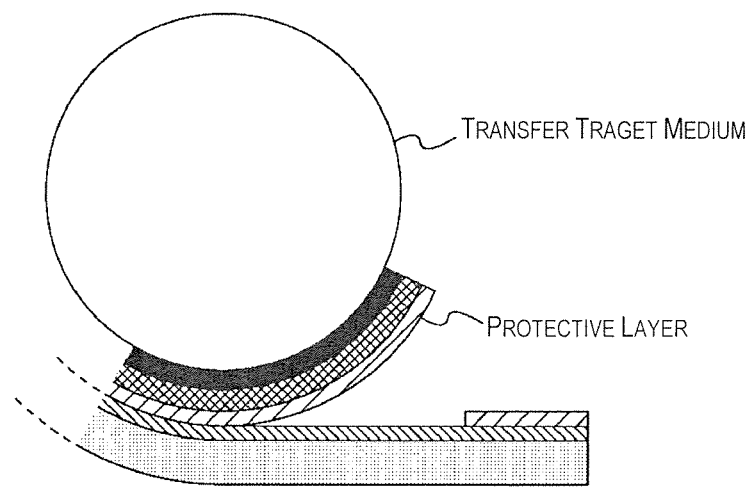
FIG. 1C illustrates a scheme of a transfer from the transfer medium to the transfer target medium.

FIG. 1C illustrates a scheme of a transfer from the transfer medium to the transfer target medium.

When the transfer medium is heated from the reverse-surface side of the base material, an adhesive force is created in the adhesion layer positioned on the surface of the transfer medium. Therefore, when the heated transfer medium is brought into contact with a transfer surface of the transfer target medium, a layer structure (a transfer foil) on the base material is caused to separate and transferred onto the transfer target medium. The protective layer, the coloring layer, and the adhesion layer are formed (transferred), in sequence from above (i.e., the surface side), on the transfer target medium after the transfer. The transfer target medium after the transfer may be referred to as a "transfer subject".

Even if the transfer surface of the transfer target medium is a curved surface, a color image can be readily formed on the curved surface. Therefore, the transfer can be performed on a transfer target medium having a variety of shapes, such as the interior of a motor vehicle, the exterior of a laptop computer, the exterior of a mobile telephone, a cosmetics container, a stationary item, or another object. The transfer surface of the transfer target medium is not limited to that having a curved surface, and a flat surface is also possible.

Although a description was given here for the basic structure of the transfer medium, the structure of the transfer medium in the embodiments described below may differ from the basic structure. However, understanding the basic structure of the transfer medium described here will also enable understanding of the structure of each of the embodiments.

Recording Device

Device for Manufacturing Transfer Medium

Basic Configuration

Figure 2:
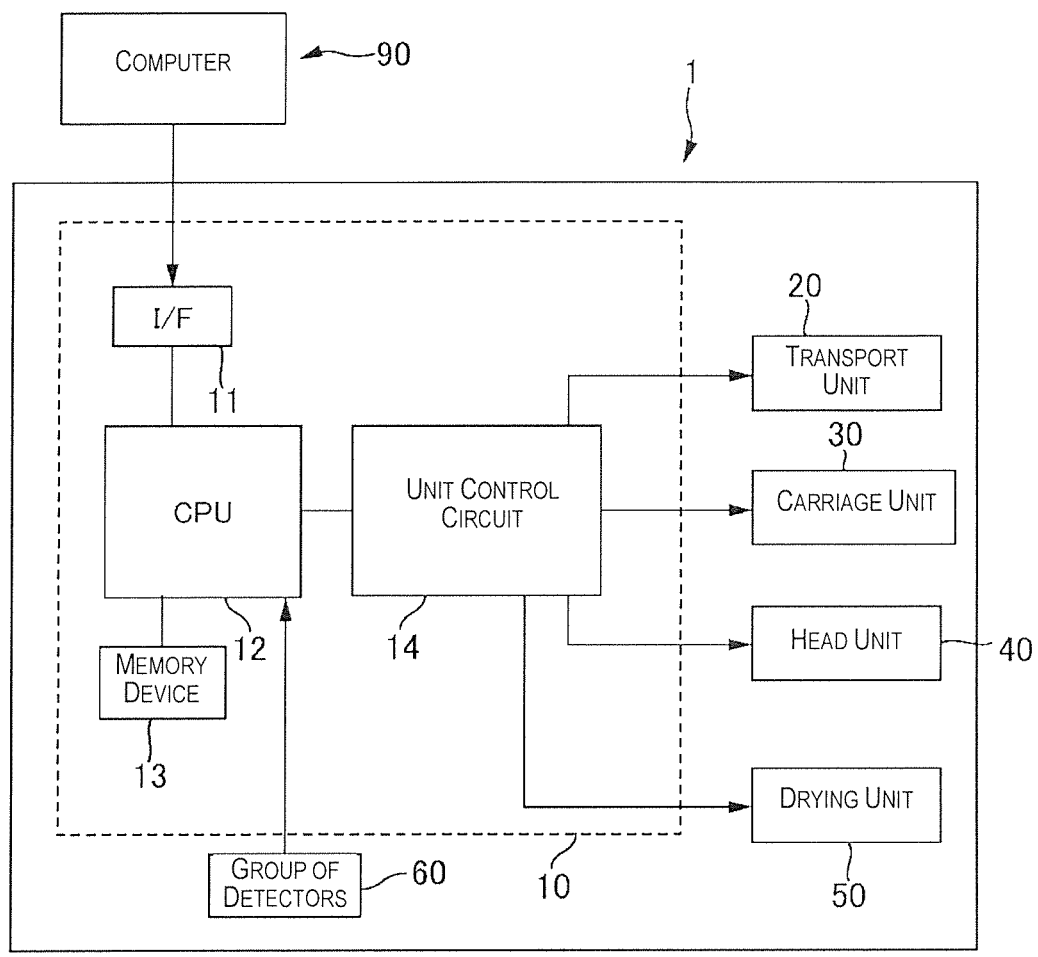
FIG. 2 is a block diagram showing the overall configuration of a recording device 1.
Figure 3A:
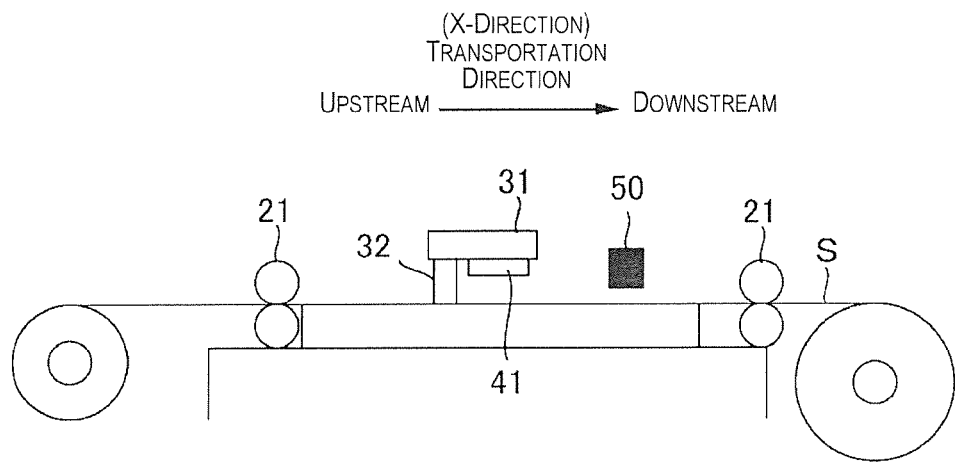
FIG. 3A is a schematic cross-section view of the recording device 1.
Figure 3B:
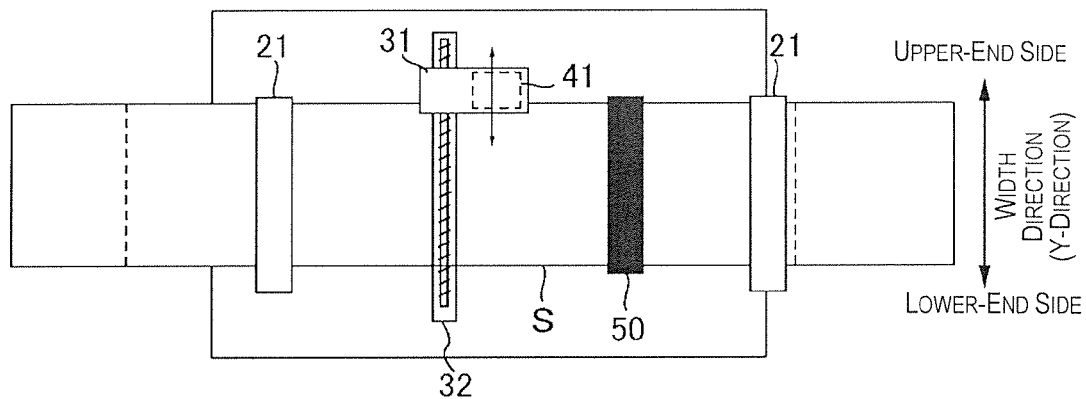
FIG. 3B is a schematic top view of the recording device 1.

FIG. 2 is a block diagram showing the overall configuration of a recording device 1; FIG. 3A is a schematic cross-section view of the recording device 1; and FIG. 3B is a schematic top view of the recording device 1. An embodiment will now be described using, as an example, a recording system in which the recording device 1 and a computer 90 are connected.

The recording device 1 is a device for recording (forming) a layer making up the transfer medium (e.g., the coloring layer) on the base material using the inkjet method. The recording device 1 has a substantially the same configuration as that of an inkjet printer, and functions as a transfer medium manufacturing device for manufacturing the transfer medium. The recording device 1 executes a recording action according to data received from the computer 90. Therefore, the computer 90 (the computer 90 installed with a recording driver described further below) functions as a control device for controlling the recording device 1.

A controller 10 is a control unit for controlling the recording device 1. An interface unit 11 is for transmitting/receiving data between the computer 90 and the recording device 1. A CPU 12 is a computation processing device for controlling the recording device 1 overall. A memory device 13 is for securing a region for storing a program, a work region, and the like for the CPU 12. The CPU 12 controls each of the units through a unit control circuit 14. The situation within the recording device 1 is monitored by a group of detectors 60, and the controller 10 controls the units on the basis of corresponding detection results.

A transport unit 20 transports a medium S (base material shown in FIG. 1A) from the upstream side to the downstream side along a direction in which the medium S extends (i.e., a transportation direction; X-direction in the drawing). A motor causes a transport roller 21 to rotate, whereby the medium S before recording is fed to a liquid application region. Then, the medium S after recording (transfer medium shown in FIG. 1B) is wound into a roll shape by a winding mechanism. In FIGS. 3A and 3B, the transport path of the medium S is straight; however, the transport path may be caused to bend using a roller or a similar element as appropriate.

A carriage unit 30 is for moving a head along a movement direction (i.e., width direction of the medium S; Y-direction in the drawing) in a reciprocating manner. The carriage unit 30 has a carriage 31 for carrying a head 41 and a carriage-moving mechanism 32 for moving the carriage in a reciprocating manner.

The head unit 40 has the head 41 provided to the carriage 31. Nozzles for discharging a liquid (ink, adhesive fluid, etc.) are provided to a lower surface of the head 41. The configuration of the head 41 (i.e., arrangement of the nozzles) will be described further below.

A drying unit 50 is for drying the liquid coated on the medium S. A warm-air heater, for example, is used as the drying unit.

The recording device 1 repeats, in an alternating manner, an action of moving the carriage 31 along the movement direction (i.e., a pass) and a transporting action. When each pass is to be performed, the controller 10 controls the carriage unit 30 and moves the carriage 31 in the movement direction; and controls the head unit 40, causes the liquid to be discharged from a predetermined nozzle on the head 41, and causes the liquid to be applied on the medium S. The controller 10 also controls the transport unit 20 and causes the medium S to be transported along the transportation direction at a predetermined transportation rate during the transporting action.

The pass and the transporting action are repeated, whereby a region to which the liquid has been applied is gradually transported towards the drying unit 50. The liquid applied to the medium S is dried at a position facing the drying unit 50, and the transfer medium is completed. The completed transfer medium is then wound into a roll shape by the winding mechanism.

Nozzle Arrangement

Figure 4:
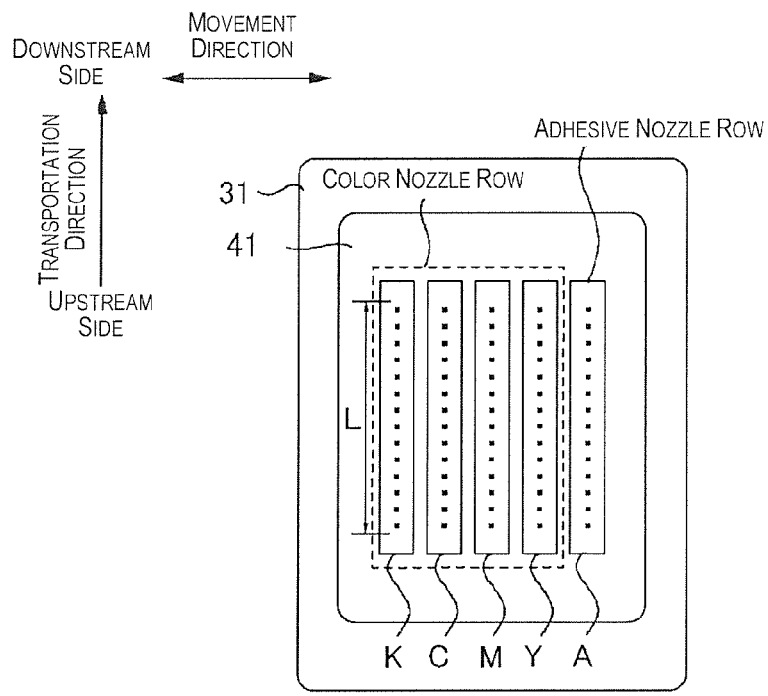
FIG. 4 illustrates nozzles on the lower surface of the head 41.

FIG. 4 illustrates nozzles on the lower surface of the head 41. The configuration shown is for reference for the purpose of description; the head 41 according to the present embodiment described further below may be configured differently.

The head 41 comprises 5 nozzle rows in this case. The 5 nozzle rows comprise a black nozzle row (K), a cyan nozzle row (C), a magenta nozzle row (M), a yellow nozzle row (Y), and an adhesive nozzle row (A) for discharging the adhesive fluid. The black nozzle row, the cyan nozzle row, the magenta nozzle row, and the yellow nozzle row are nozzle rows (color nozzle rows) for discharging a color ink for recording a color image (coloring layer). The adhesive nozzle row is a nozzle row for discharging the adhesive fluid for recording the adhesion image (adhesion layer).

Each of the nozzle rows is made up from 180 nozzles. The 180 nozzles of each of the nozzle rows are arranged in a row along the transportation direction at a nozzle pitch of $\frac{1}{180}$-inch intervals (i.e., L in the drawing represents 1 inch). A liquid is intermittently discharged from a given nozzle row, whereby a large number of dot rows are recorded at $\frac{1}{180}$-inch intervals each time the carriage 31 moves once along the movement direction (i.e., with each pass). When D is the interval between dots recorded on the medium, the nozzle pitch may be expressed as k×D using an integer k. For example, in a case in which an image is recorded at a resolution of 720 dpi, D equals $\frac{1}{720}$ inch; therefore, k=4.

Procedure for Manufacturing Transfer Medium
Processes Performed by Computer 90

A description will now be given for a procedure for manufacturing the transfer medium. First, a description will be given for processes performed by the computer 90.

Figure 5:
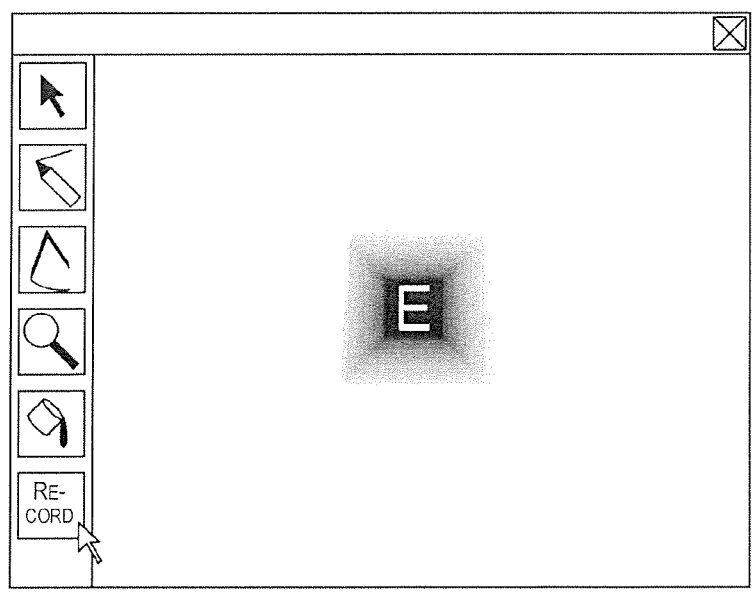
FIG. 5 illustrates a drawn image.

On the computer 90, the user draws an image using a drawing program and performs an operation to record the image on the recording device 1. Here, it is assumed that the user has, on the computer 90, drawn an image in which a character "E" is displayed in white on a gradation pattern that is darker at the center and increasingly lighter towards the outside as shown in FIG. 5, and issued a command to record this image in the recording device 1. When the user issues a "record" command in the drawing program, a recording driver program (hereafter referred to as a "recording driver") of the computer 90 is launched.

Figure 6:
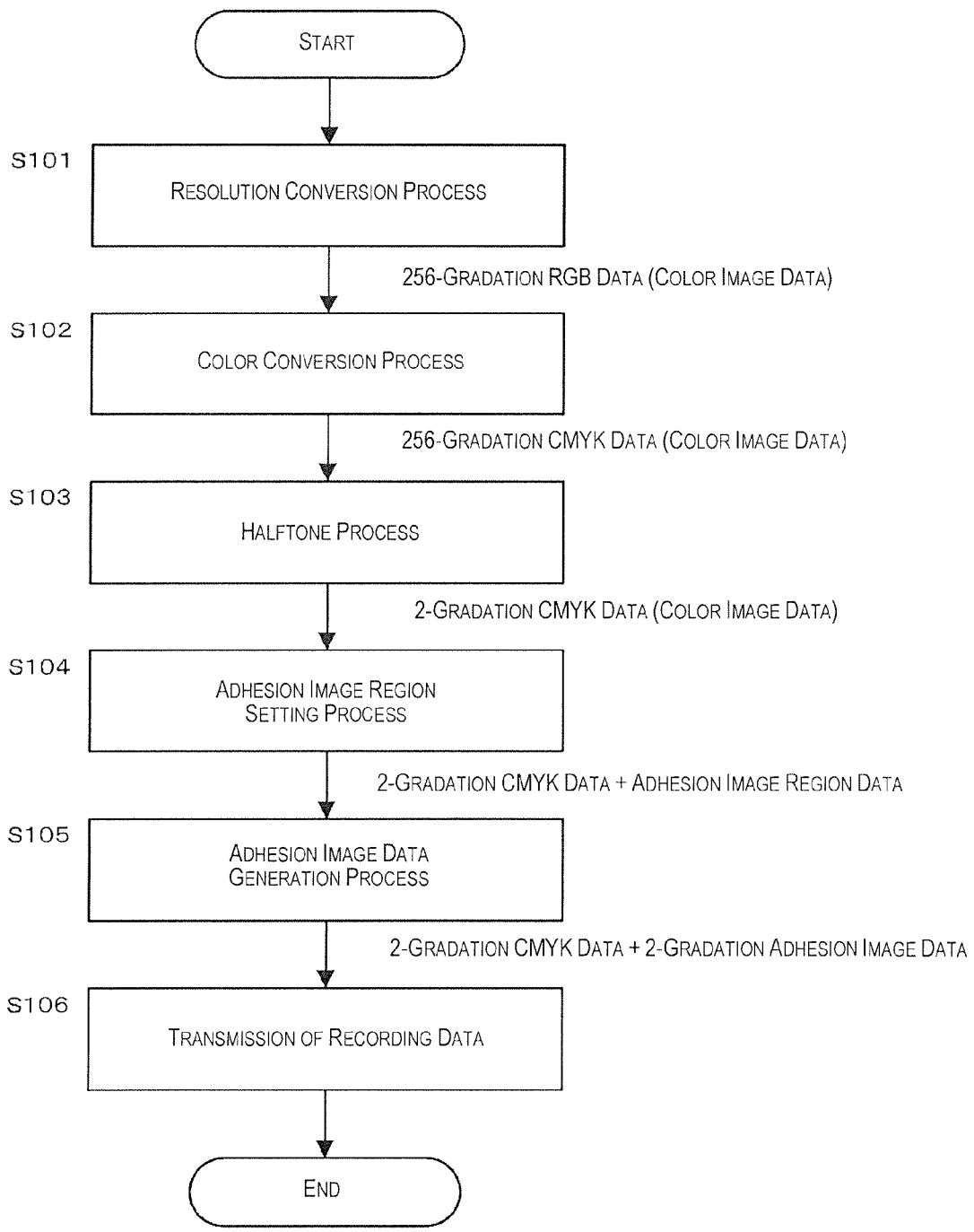
FIG. 6 is a flow chart showing processes performed by the recording driver.

FIG. 6 is a flow chart showing processes performed by the recording driver. The recording driver constitutes a color image data generating part and an adhesion image data generating part of this embodiment.

First, the recording driver performs a resolution conversion process (S101) for converting image data (text data, picture data, etc.) acquired from the drawing program into a resolution used to record onto the medium (i.e., a recording resolution). For example, in a case in which the recording resolution is 720×720 dpi, the vector-format image data received from the drawing program is converted into bitmap-format image data having a resolution of 720×720 dpi. The resolution conversion process generates RGB data (bitmap-format image data) having multiple gradations (e.g., 256 gradations) represented by a RGB color space.

Next, the recording driver performs a color conversion process (S102) for converting data in a RGB color space into data in a CMYK color space. CMYK data is data corresponding to the colors of the color inks held by the recording device 1. This color conversion process is performed on the basis of a table (color conversion look-up table LUT) in which the gradation values of the RGB data are associated with gradation values of the CMYK data. The color conversion process generates CMYK data (bitmap-format image data) of 256 gradations represented by a CMYK color space. However, in the following descriptions, in order to simplify the description, the color image to be recorded will be assumed to be a monochrome single-color image, and a description will be given for the K data from among the CMYK data.

Figure 7A:
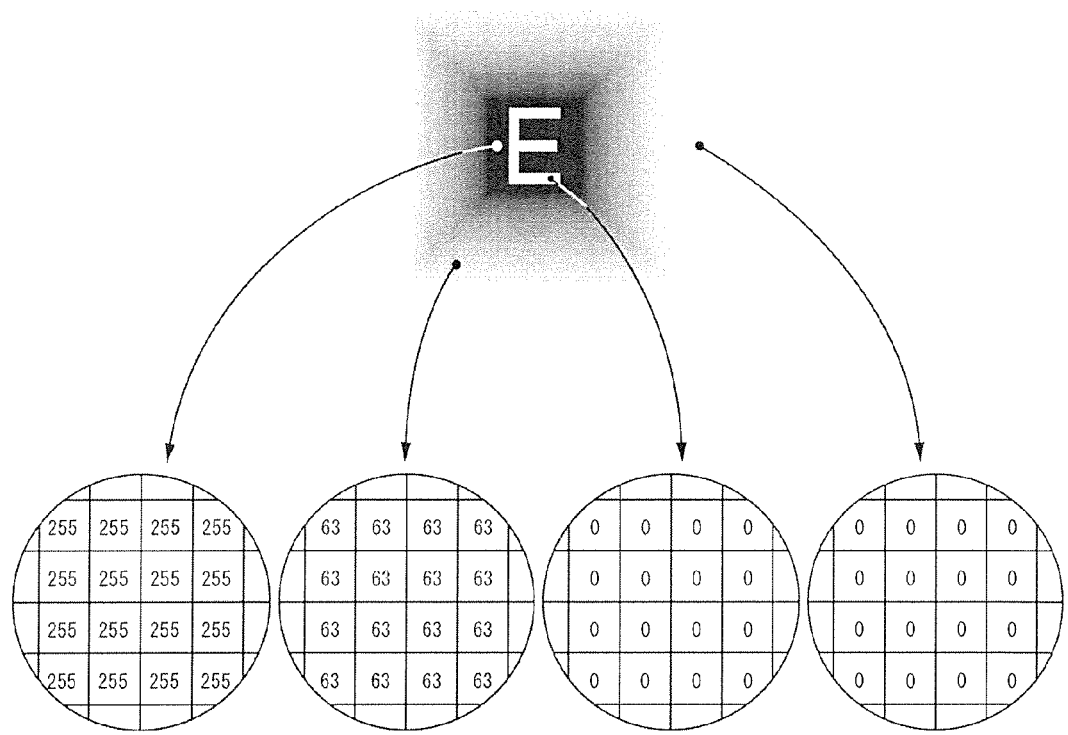
FIG. 7A illustrates the image data before a halftone process.

FIG. 7A illustrates the image data before a halftone process. The image data is made up from a large number of pixels arranged in a two-dimensional form, and pixel data of 256 gradations is associated with each of the pixels. Here, the maximum gradation value of 255 is associated with a pixel making up a dark region; an intermediate gradation value representing gray is associated with a pixel making up a gradated region; and a gradation value of 0 representing colorlessness is associated with a pixel in the white character region or a region outside of the color image.

Next, the recording driver performs a halftone process (S103) for converting the data having a large number of gradations into data having a number of gradations that can be formed by the recording device 1. For example, the halftone process converts data representing 256 gradations into 1-bit data representing 2 gradations or similar data. In the halftone process, dithering, gamma correction, error diffusion, or a similar process is used. Data that has been subjected to the halftone process has a resolution equivalent to the recording resolution (e.g., 720×720 dpi). In the image data after the halftone process, 1-bit pixel data is associated with each pixel; this pixel data functions as data representing the dot formation status (i.e., the presence or absence of a dot) in each of the pixels.

Figure 7B:
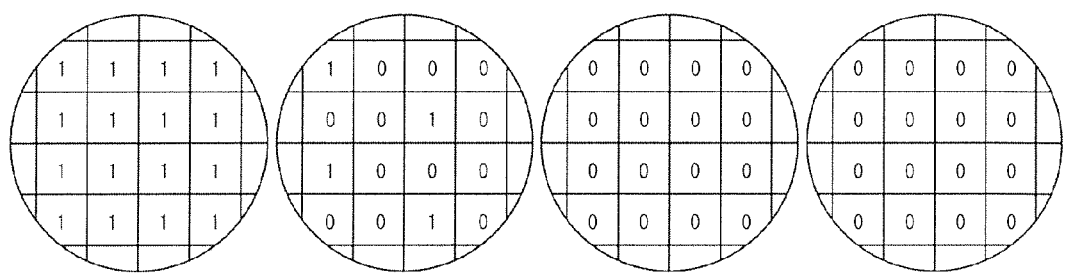
FIG. 7B illustrates the image data after the halftone process.

FIG. 7B illustrates the image data after the halftone process. In the image data after the halftone process, pixel data of 2 gradations is associated with each of the pixels. In the dark region, a gradation value of 1 indicating a dot is to be formed is associated with substantially all pixels. In other words, the image data in this region indicates a dot is to be arranged on all pixels. In the white character region and the exterior region of the color image, a gradation value of 0 indicating a dot is not to be formed is associated with all pixels. In the gradated region (gray region), there is a mixture of pixels associated with a gradation value of 1 and pixels associated with a gradation value of 0. In other words, the image data in this region indicates that dots are to be dispersedly arranged. In a light gray region, a state is present in which the number of pixels associated with a gradation value of 0 is greater than the number of pixels associated with a gradation value of 1.

Figure 8:
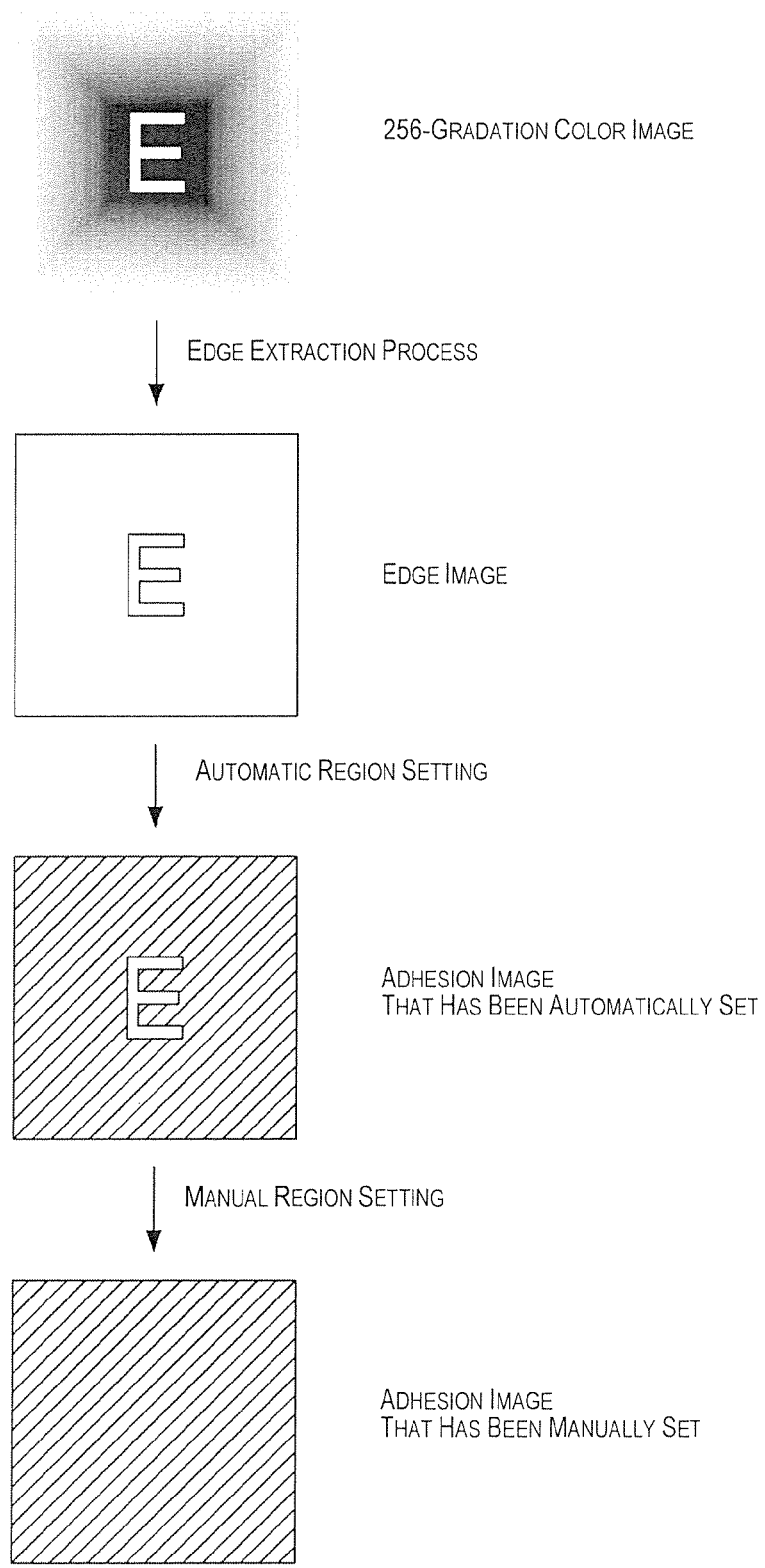
FIG. 8 illustrates the adhesion image region setting process.

Next, the recording driver sets a region of the adhesion image for forming the adhesion layer (S104). FIG. 8 illustrates the adhesion image region setting process.

First, the recording driver performs an edge extraction process on the 256-gradation image data after the resolution conversion process (RGB data) or the 256-gradation image data after the color conversion process (CMYK data). In the edge extraction process, pixels having a gradation value of 0 (i.e., a colorless pixel) in the 256-gradation color image that are adjacent to a pixel having gradation value equal to or greater than 1 (i.e., colored pixels) are extracted as edge pixels. This edge extraction process generates an edge image representing an outline (edge) of the 256-gradation color image. In the edge image shown in the drawing, pixels extracted as edge pixels are shown in black (a black line). Here, pixels corresponding to an outside outline of the gradation pattern and pixels corresponding to an outline of the white character "E" (pixels corresponding to an inside outline of the gradation pattern) are extracted as edge pixels, and an edge image is generated.

Then, the recording driver automatically sets a region surrounded by edge pixels as a region of the adhesion image (region shaded with diagonal lines in the drawing). In a case, such as in the edge image shown in FIG. 8, in which a region surrounded by edge pixels (region surrounded by edge pixels representing the outside outline of the gradation pattern) further contains a region surrounded by edge pixels (region surrounded by edge pixels representing the outline of the white character "E"), a region in between is set, as a region surrounded by edge pixels, as the region of the adhesion image. As a result of this automatic region setting, a region, within the 256-gradation color image, in which pixels have a gradation value equal to or greater than 1 (i.e., colored pixels) is automatically set as the region of the adhesion image.

The adhesion image that has been automatically set is displayed on a display of the computer 90 to be checked by the user (graphic designer). The user is able to manually set, through the recording driver, the region of the adhesion image that has been automatically set. Here, it is assumed that the user, taking into account the gloss of the image after being transferred onto the transfer target medium, prefers to include the region corresponding to the character "E" in the region of the adhesion image; and that the user has set the region of the adhesion image accordingly (i.e., it is assumed, as described further below, that the user prefers a gloss such as that shown in FIG. 15D, instead of a gloss such as that shown in FIG. 15C).

Next, the recording driver performs a process of generating two-gradation data (adhesion image data) representing the situation of adhesive fluid dot formation (S105). The adhesion image data generation process is a process for generating data representing the adhesion image made up from adhesion dots.

Figure 9:
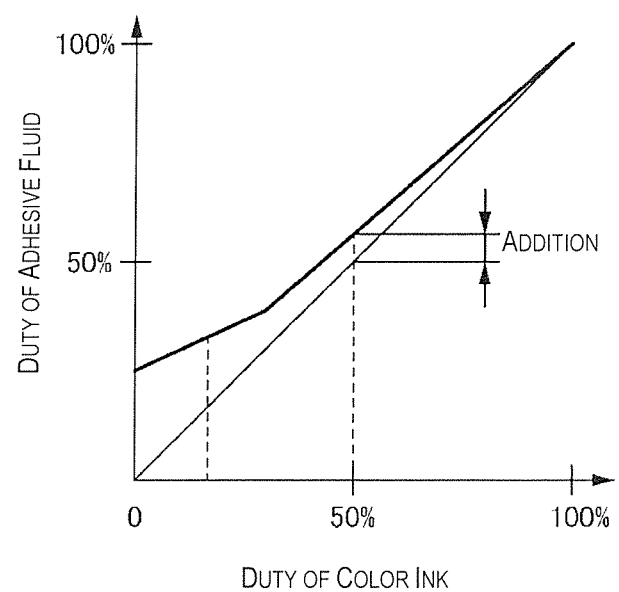
FIG. 9 is a graph used to illustrate the process of S105.

FIG. 9 is a graph used to illustrate the process of S105. The horizontal axis of the graph represents the duty of the color ink, and the vertical axis of the graph represents the duty of the adhesive fluid. The duty is a parameter that represents the amount of liquid discharged, and is the amount of ink discharged per unit area. For example, the duty is a value that is equivalent to 100% in a case in which the liquid is to be applied to every pixel (i.e., in a case in which a dot is to be formed in every pixel). The bold line on the graph is a graph line showing the duty of the adhesive fluid. In other words, the bold line on the graph represents the duty of the adhesive fluid in relation to the duty of the color ink. Data representing the relationship of the duty of the adhesive fluid in relation to the duty of the color ink is stored in advance in the recording driver.

Figure 10A:
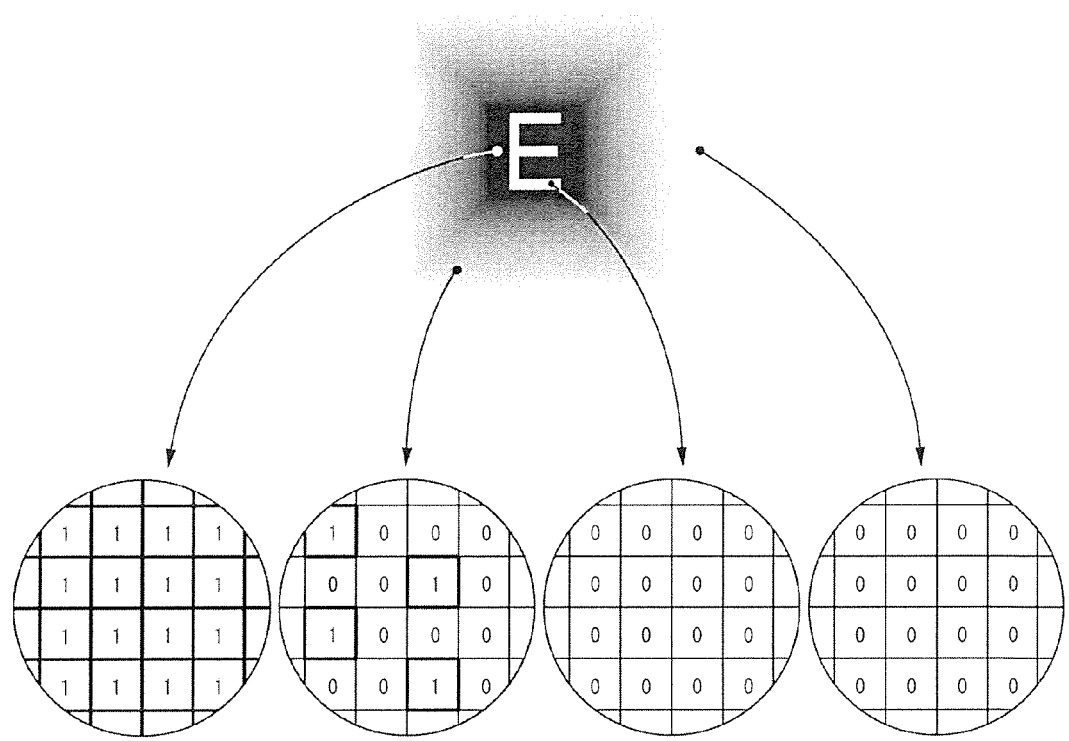
FIGS. 10A and 10B illustrate the process of S105.
Figure 10B:
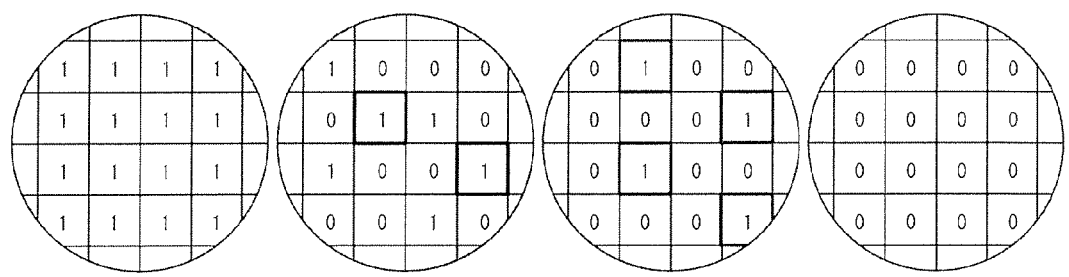

FIGS. 10A and 10B illustrate the process of S105.

A description will now be given for the adhesion image data generation process (S105) with reference to FIGS. 9, 10A, and 10B.

As shown in FIG. 10A, the recording driver generates image data so that an adhesion dot is formed on a pixel in which a color dot is formed. Put otherwise, the recording driver generates a copy of the color image data of FIG. 7B. This image data functions as data for a provisional adhesion image. In the image data, pixels associated with a gradation value of 1 indicate an adhesion dot is to be formed, and pixels associated with a gradation value of 0 indicate an adhesion dot is not to be formed. If the adhesive fluid is discharged onto the medium according to this image data, the duty of the adhesive fluid will be as shown by the thin line on FIG. 9. Although the color image data here comprises the K data only, in a case of a color image having a plurality of colors (CMYK data), the data for the hypothetical adhesion image is to be generated as a logical sum of the image data for each of the colors.

Next, in relation to the pixel data of the region of the adhesion image set in S104, the recording driver converts pixel data having a gradation value of 0 into a gradation value of 1 so that the duty of the adhesive fluid in relation to the duty of the color ink is as shown by the bold line in FIG. 9. Put otherwise, the recording driver further adds adhesion dots to the image shown in FIG. 10A and updates the image data for the adhesion image as shown in FIG. 10B. In FIG. 10B, pixels to which an adhesion dot has been added are indicated by bold frames. The recording driver obtains the duty of the color ink on the basis of the color image data after the halftone process (FIG. 7B), and determines, on the basis of the duty of the color ink, the number and amount of adhesion dots to be added. Accordingly, there is generated data for the adhesion image in which the adhesion dots are arranged so that the duty of the adhesive fluid (amount of adhesive fluid applied per unit area) is equivalent to amount applied that corresponds to the duty of the color ink.

In the present embodiment, the image data of FIG. 10B (image data representing the state of formation of the adhesion dots) is generated by adding adhesion dots using the image data of FIG. 10A as a basis. It is thereby possible to generate image data for the adhesion image so that the adhesion dot is inevitably formed on a pixel in which a color dot is formed. As a result, the transfer performance of the color dots is enhanced.

The number and amount of the adhesion dots to be added are the number and amount corresponding to the difference between the bold line and the thin line in FIG. 9. For example, in a region in which the duty of the color ink is 50%, the duty of the adhesive fluid from the adhesion dots that have been added is equal to the duty corresponding to "addition" as labeled in the drawing.

As shown by the bold line in FIG. 9, the proportion of the duty of the adhesive fluid in relation to the duty of the color ink increases with decreasing duty of the color ink. For example, in a region in which the duty of the color ink is 50%, the duty of the adhesive fluid is moderately greater than the duty of the color ink. However, in a region in which the duty of the color ink is 20%, the duty of the adhesive fluid is approximately double the duty of the color ink. In a region in which the duty of the color ink is lower than 20%, the proportion of the duty of the adhesive fluid in relation to the duty of the color ink is even higher. Thus, the duty of the adhesive fluid in relation to the duty of the color ink increases with decreasing duty of the color ink, whereby the surface of the transfer medium can be made as smooth as possible, and the transfer performance is enhanced, as described further below.

As shown by the bold line in FIG. 9, the duty of the adhesion dots to be added increases with decreasing duty of the color ink. Therefore, the graph line shown by the bold line in FIG. 9 is in a state of having a smaller gradient than the graph line shown by the thin line. Thus, the duty of the adhesion dots to be added increases with decreasing duty of the color ink, whereby the surface of the transfer medium can be made as smooth as possible and the transfer performance is enhanced as described further below. Also, the graph line shown by the bold line in FIG. 9 has a smaller tilt in a region in which the duty of the color ink is smaller than in a region in which the duty of the color ink is larger. It is thereby possible to make the surface of the transfer medium smoother, and the transfer performance is enhanced.

In the present embodiment, the recording driver generates the image data for the adhesion image so that the adhesion dots are formed at a predetermined duty even in a region in which the duty of the color ink is zero, as long as the region is within the region of the adhesion image. For example, in the region corresponding to the white character in FIG. 7A, the duty of the color ink is zero (a gradation value of 0 is associated with pixel data for color in this region); however, since this region is included in the region of the adhesion image, in the image data for the adhesion image, some of the pixel data in this region is converted into a gradation value of 1.

Meanwhile, the recording driver does not perform this process on pixel data outside the region of the adhesion image. For example, in the exterior region of the color image in FIG. 7A, the duty of the color ink is zero (a gradation value of 0 is associated with the pixel data for color); however, since this region is not included in the region of the adhesion image, no adhesion dots are formed in this region.

Thus, according to the present embodiment, even in relation to a region in which the duty of the color ink is zero (i.e., even in relation to a region in which the gradation value is 0 on the 256-gradation color image data), the image data for the adhesion image is generated so that the amount of the adhesive fluid applied per unit area (i.e., rate of generation of the adhesion dots) is different depending on whether the region is inside or outside the region of the adhesion image. As long as the region is within the region of the adhesion image, the image data for the adhesion image is generated so that adhesion dots are formed at a predetermined duty within this region, even if the duty of the color ink is zero. In contrast, outside the region of the adhesion image, if the duty of the color ink is zero, there are no color dots to be transferred; therefore, no adhesion dots are formed (i.e., the duty of the adhesive fluid is zero).

Finally, the recording driver adds control data for controlling the recording device 1 to the image data for the color image generated in S103 and the image data for the adhesion image generated in S105, generates recording data, and transmits the recording data to the recording device 1 (S106).

Processes Performed by Recording Device 1

The recording device 1 controls each of the units according to the control data in the recording data; and at the same time forms, on the medium, a coloring layer made up from color dots (i.e., a color image) and an adhesion layer made up from adhesion dots (i.e., an adhesion image) according to the situation of dot generation indicated by the image data in the recording data. Here, the recording device 1 repeats, in an alternating manner, an action of moving the carriage 31 along the movement direction (i.e., a pass) and a transporting action. In each of the passes, the recording device 1 moves the carriage 31 in the movement direction, causes the liquid to be discharged from a predetermined nozzle on the head 41, and causes the liquid to be applied on the medium S. In each transporting action, the recording device 1 uses the transport unit 20 to cause the medium S to be transported along the transportation direction at a predetermined transportation rate.

Figure 11:
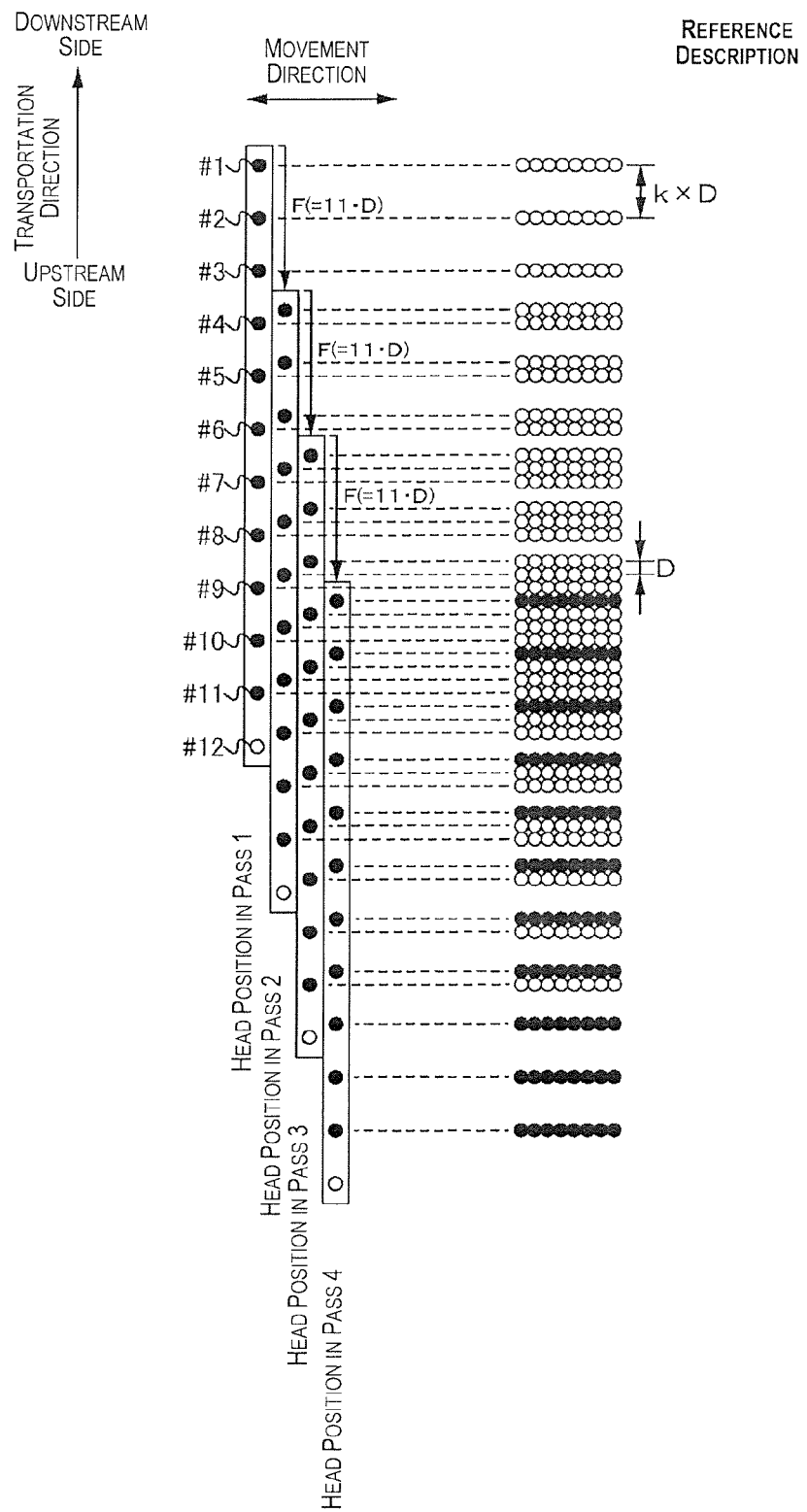
FIG. 11 illustrates a recording method according to a reference example.

FIG. 11 illustrates a recording method according to a reference example. As a reference example, a description will be first given for a case in which one type of nozzle row is used to form one image on the medium (in contrast, in the present embodiment, as described further below, a color nozzle row and an adhesive nozzle row are used to form a color image and an adhesion image on the medium in an overlapping manner). The drawing shows the position of the head (nozzle row) and the scheme of recording dots in pass 1 through pass 4 in a recording method according to an interlace method.

For the sake of convenience of the description, only one nozzle row from among a plurality of nozzle rows are shown, and the number of nozzles shown is also smaller (12 in this instance). Nozzles represented by black circles in the drawing are nozzles that are capable of discharging a liquid. Nozzles represented by white circles are nozzles that are incapable of discharging a liquid. To facilitate the description, the nozzle row is drawn so as to appear to be moving (relative to the medium S). However, the drawing is one showing the relative positions of the head and the medium; in reality, the medium S is transported in the transportation direction. Also, for the sake of convenience of the description, the drawing is shown so that each of the nozzles appears to record several dots (circles in the drawing) only. However, in reality, liquid droplets are intermittently discharged from nozzles moving in the movement direction; therefore, a large number of dots are arranged in a row along the movement direction. This row of dots is also referred to as a raster line. Dots represented by black circles are dots that are recorded during the most recent pass, and dots represented by white circles are dots that have been recorded during previous passes.

According to the interlace method, k is equal to or greater than 2. The interlace method is a recording method in which a raster line that is not to be recorded is present between raster lines that are to be recorded during a single pass. For example, according to the recording method shown in the drawing, three raster lines are present between raster lines that are to be recorded during a single pass.

According to the interlace method, each time the medium is transported along the transportation direction at a uniform transportation rate F, the nozzles record a raster line immediately above a raster line recorded during the preceding pass. Conditions required for recording to be thus performed at a uniform transportation rate are that (1) the number of nozzles N (an integer) that are capable of discharging the liquid is in a relatively prime relationship with k, and (2) the transportation rate F is set to N·D.

In this drawing, the nozzle row has 12 nozzles arranged in a row along the transportation direction. The integer k in the nozzle pitch k×D is equal to 4. Therefore, in order to satisfy the condition of the interlace method of N and k being in a relatively prime relationship with each other, not all nozzles are used; instead, 11 nozzles (nozzle no. 1 through nozzle no. 11) are used. Also, since 11 nozzles are used, the medium is transported at a transportation rate of 11·D. As a result, using a nozzle row having a nozzle pitch of 180 dpi (4·D), dots are recorded on the medium at a dot interval of 720 dpi (=D). In a case in which the interlace method is performed using a nozzle row comprising 180 nozzles, a pass in which 179 nozzles are used and a transporting action at a transportation rate of 179·D are repeated in an alternating manner.

In the instance of the interlace method, k passes are necessary to complete continuous raster lines at a nozzle-pitch width. For example, 4 passes are necessary to complete 4 raster lines that are continuous at a dot interval of 720 dpi using a nozzle row having a nozzle pitch of 180 dpi. The drawing shows that continuous raster lines are recorded at a dot interval of D on the upstream side, with regards to the transportation direction, from a raster line recorded by nozzle no. 3 in pass 3.

Figure 12:
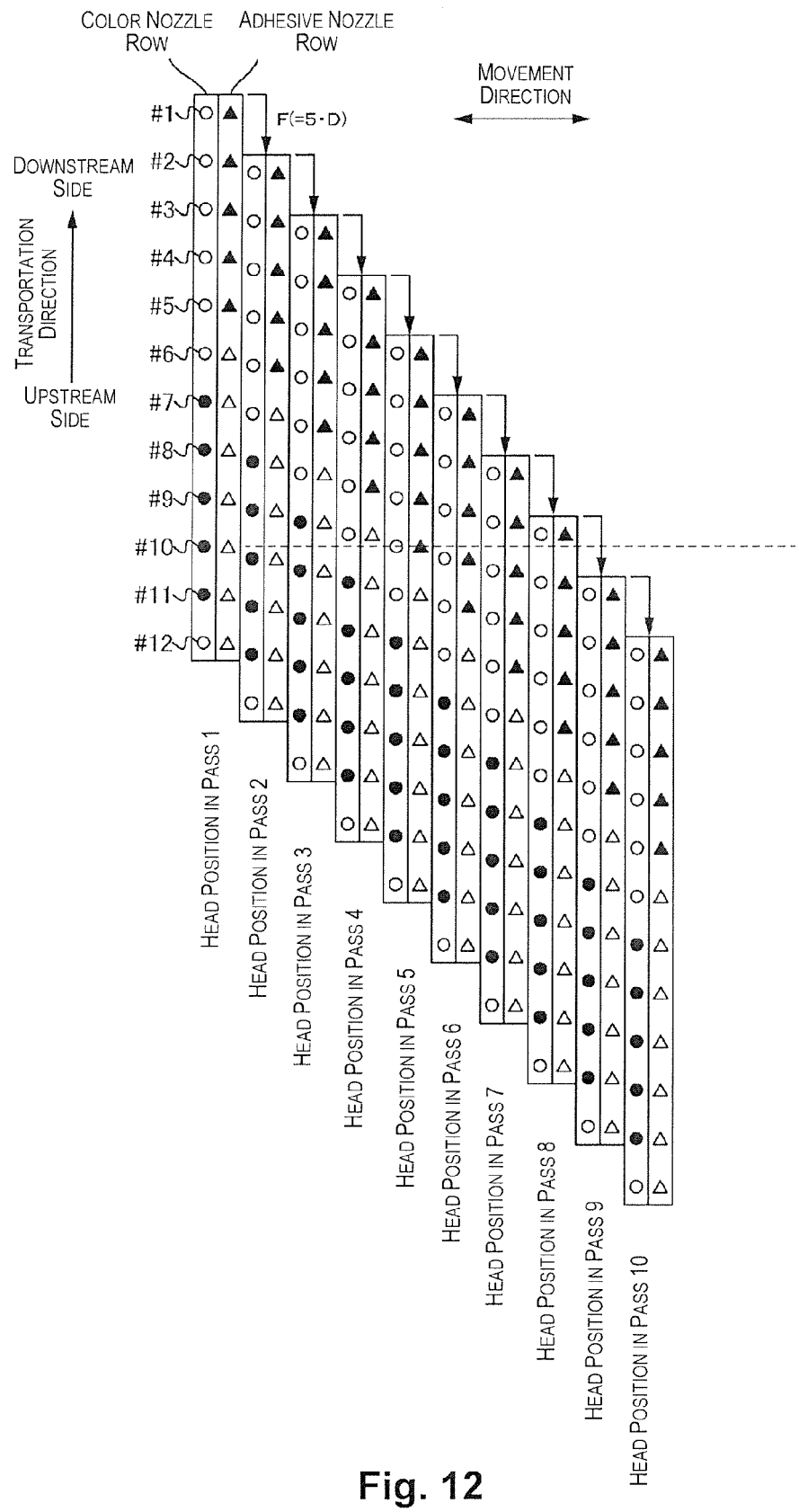
FIG. 12 illustrates a recording method when an adhesion layer (adhesion image) is formed after the coloring layer (color image) is formed using the interlace method.

FIG. 12 illustrates a recording method when an adhesion layer (adhesion image) is formed after the coloring layer (color image) is formed using the interlace method. In the drawing, nozzles in the color nozzle row are indicated by circles, and nozzles in the adhesive nozzle row are indicated by triangles.

In a case in which the adhesion layer is recorded in an overlapping manner on top of the coloring layer, the coloring layer is formed using half of the nozzles of the color nozzle row on the upstream side in the transportation direction, and the adhesion layer is formed using half of the nozzles of the adhesive nozzle row on the downstream side with regards to the transportation direction. Here, in relation to the color nozzle row, nozzles on the half of the nozzle row on the upstream side with regards to the transportation direction (nozzle nos. 7 through 12) are used; and in relation to the adhesive nozzle row, nozzles on the half of the nozzle row on the downstream side with regards to the transportation direction (nozzle nos. 1 through 6) are used. However, in order to satisfy the conditions of the interlace method (i.e., (1) the number of nozzles N (an integer) that are capable of discharging the liquid is in a relatively prime relationship with k, and (2) the transportation rate F is set to N·D), the liquid is discharged from 5 nozzles out of the 6 nozzles, and the medium is transported at a transportation rate of 5·D.

Recording the dots as shown in the drawing causes, in all raster line positions, an adhesion dot to be formed by a nozzle of the adhesive nozzle row after a color dot is formed by a nozzle of the color nozzle row. For example, in the raster line at the position shown by a dotted line in the drawing, an adhesion dot is formed by nozzle no. 5 of the adhesive nozzle row in pass 5 after a color dot is formed by nozzle no. 10 of the color nozzle row in pass 1.

Figure 13A:
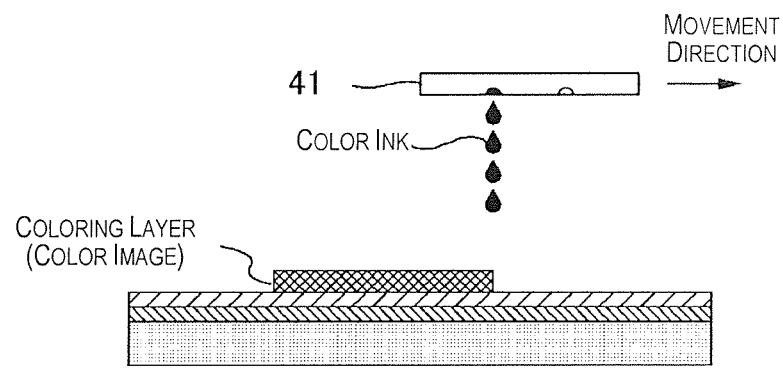
FIGS. 13A and 13B illustrate the sequence of forming the coloring layer and the adhesion layer.
Figure 13B:
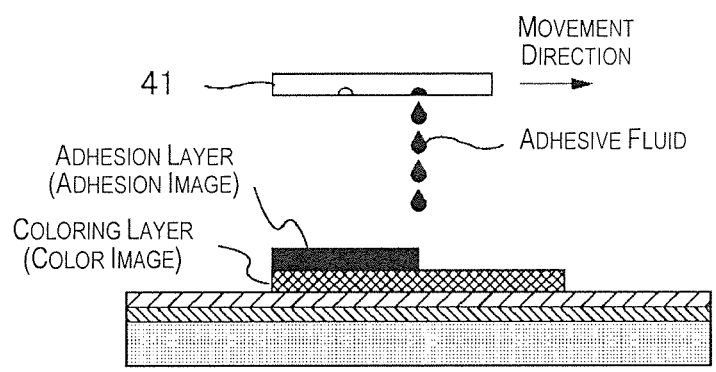

FIGS. 13A and 13B illustrate the sequence of forming the coloring layer and the adhesion layer. As shown in FIGS. 13A and 12, an adhesion layer is formed in 4 passes using half of the nozzles of the adhesive nozzle row on the downstream side with regards to the transportation direction on top of the coloring layer formed in 4 passes using half of the nozzles of the color nozzle row on the upstream side with regards to the transportation direction. It is thus possible to form an adhesion layer (adhesion image) made up from adhesion dots on top of the coloring layer (color image) made up from color dots.

Image on Transfer Medium and Transfer Target Medium

Figure 14A:
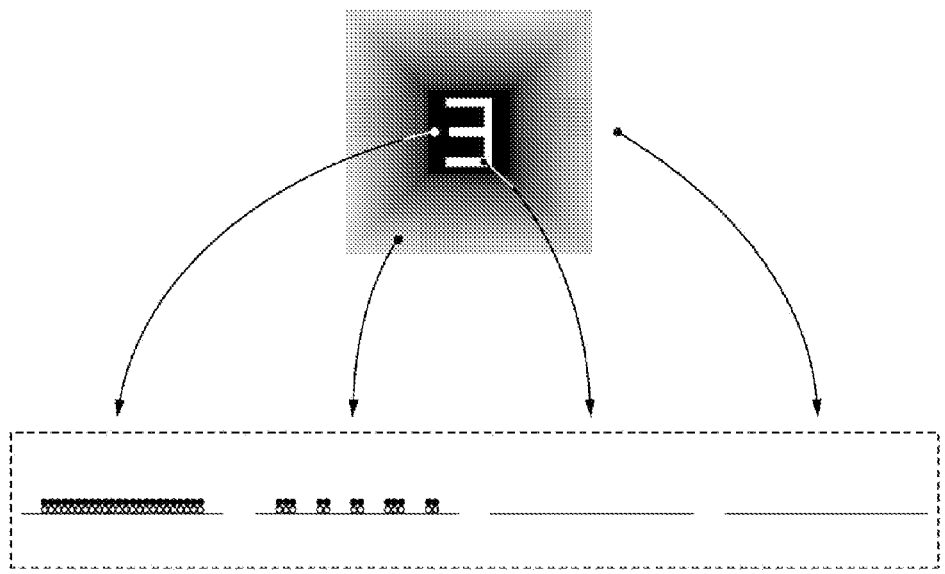
FIGS. 14A and 14B illustrate dots on the transfer medium.
Figure 14B:
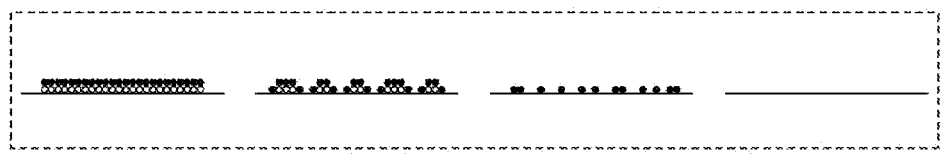

FIGS. 14A and 14B illustrate dots on the transfer medium. FIG. 14A is an illustrative diagram used for comparison, and illustrates a case in which no adhesion dots have been added in the aforementioned S105 (see also FIG. 10A). FIG. 14B illustrates the present embodiment, and illustrates a state in which the adhesion dots have been added in S105 (see also FIG. 10B). In the drawing, white circles represent color dots and black circles represent adhesion dots.

In the present embodiment, an adhesion dot is inevitably formed on a pixel in which a color dot is formed. Therefore, it is possible to transfer color dots to the transfer target medium in a highly accurate manner, and suppress any leakage of color dots being transferred. This is because if an adhesion dot is not formed on a pixel in which a color dot is formed, the transfer performance of the corresponding color dot becomes poorer.

In the present embodiment, within the region of the adhesion image, adhesion dots are formed at a predetermined duty even in a region in which the duty of the color ink is zero. Therefore, within the region of the adhesion image, a part of the protective layer (see FIG. 1C) is transferred to the transfer target medium. For example, in the region corresponding to the white character in FIG. 14, the duty of the color ink is zero; however, adhesion dots are formed in this region. Therefore, in the region corresponding to the white character in FIG. 14, a part of the protective layer is transferred to the transfer target medium. In contrast, in the exterior of the region of the adhesion image, no adhesion dots are formed, and the protective layer is therefore not transferred. The resulting effect will now be described.

Figure 15A:
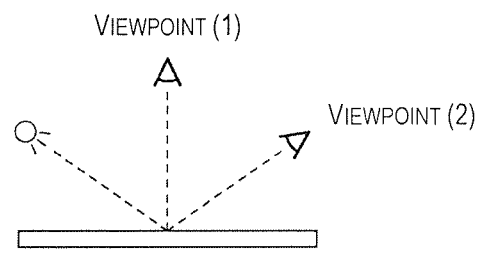
FIG. 15A illustrates two viewpoints from which the transfer target medium is viewed.
Figure 15B:
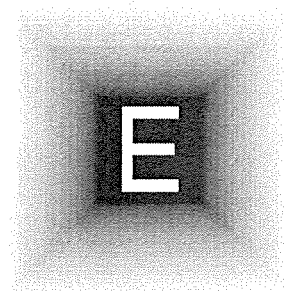
FIG. 15B illustrates the transferred image as viewed from viewpoint (1)
Figure 15C:
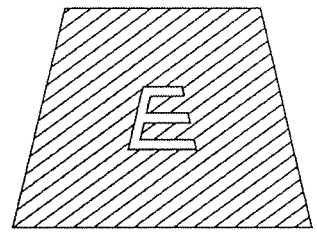
FIGS. 15C and 15D illustrate the transferred image as viewed from viewpoint (2)
Figure 15D:
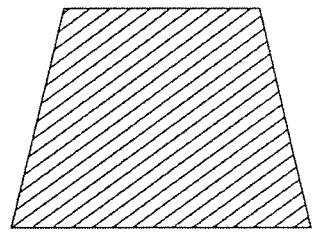

FIG. 15A illustrates two viewpoints from which the transfer target medium is viewed. FIG. 15B illustrates the transferred image as viewed from viewpoint (1). FIGS. 15C and 15D illustrate the transferred image as viewed from viewpoint (2). FIG. 15C is an illustrative drawing used for comparison, and illustrates a case in which no adhesion dots have been added in the aforementioned S105 (see also FIG. 10A). FIG. 15D illustrates the present embodiment, and illustrates a state in which the adhesion dots have been added in S105 (see also FIG. 10B). In FIGS. 15C and 15D, hatching is applied to a region that appears shiny (a region having a high gloss).

When an observer views the transfer target medium from above as shown in FIG. 15B, the observer views the color of the image without observing much effect of the gloss. In contrast, when the observer observes the transfer target medium diagonally as shown in FIGS. 15C and 15D, the observer views light that has undergone regular reflection on the transfer target medium; a state is present in which the observer is primarily observing the gloss of the image, rather than the color of the image. Here, in a region in which the transferred image is not present, the gloss of the transfer surface itself of the transfer target medium is observed. Meanwhile, in a region in which the image is present, the gloss of the protective layer transferred from the transfer medium is observed. In other words, a state is present in which the gloss is different depending on the presence or the absence of the transferred image.

In the region corresponding to the white character, color dots to be transferred are inherently absent. However, if no adhesion dots are formed in the region corresponding to the white character, the protective layer will not be transferred to the transfer target medium; therefore, as shown in FIG. 15C, the gloss on the region corresponding to the white character will be different from the surrounding gloss. However, the user (graphic designer) who created the image may not prefer a visual appearance of such description.

Therefore, in the present embodiment, in a case in which the user does not prefer an appearance in which the region corresponding to the white character has a different glossiness, the user sets the region of the adhesion image that the region corresponding to the character "E" is included in the region of the adhesion image as already shown in FIG. 8. Then, the adhesion dots are arranged so that the duty of the adhesive fluid differs between inside and outside the region of the adhesion image, even for a region in which the duty of the color ink is zero.

Specifically, in the region corresponding to the white character, which is inside the region of the adhesion image, adhesion dots are formed so that a predetermined duty is reached even if the duty of the color ink is zero (see FIG. 14B). As a result, as shown in FIG. 14D, in a region that has been set as the adhesion image, a difference in glossiness occurs less readily, and a substantially consistent glossiness can be obtained.

Meanwhile, outside the region of the adhesion image, in a case in which the duty of the color ink is zero, no adhesion dots are formed. As a result, as shown in FIG. 15D, the region outside the adhesion image has a gloss that is different from that of the region inside. Since no adhesion dots are formed in this region, consumption of the adhesive fluid can be suppressed.

In the present embodiment, as shown in FIG. 9, the proportion of the duty of the adhesive fluid in relation to the duty of the color ink increases with decreasing duty of the color ink. Also, as shown in FIG. 9, the duty of the adhesive dots to be added increases with the duty of the color ink. As a result, the difference in the amount of liquids (the color ink and the adhesive fluid) applied between the darker region and the lighter region on the color image is suppressed on the transfer medium. For example, when the difference in the amount of liquids applied between the darker region and the lighter region is compared between FIGS. 14A and 14B, the difference in the amount of liquids applied is smaller in FIG. 14B. In the present embodiment, the surface of the transfer medium can thereby be made as smooth as possible, and the transfer performance is enhanced.

First Modification Example

Figure 16:
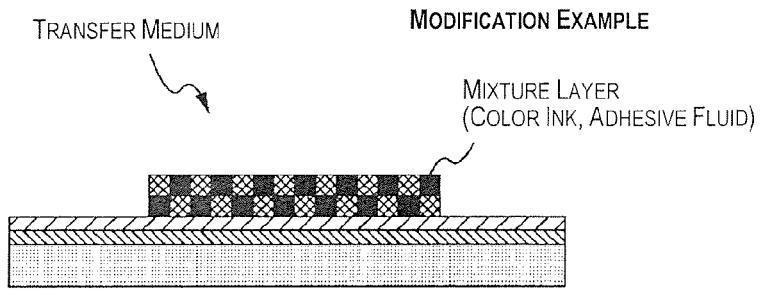
FIG. 16 illustrates the transfer medium according to a modification example.

FIG. 16 illustrates the transfer medium according to a modification example. In the modification example, a mixture layer made up from the color ink and the adhesive fluid is formed. In the mixture layer, an adhesion dot is formed on top of a color dot in certain pixels, and a color dot is formed on top of an adhesion dot in other pixels. In other words, in the mixture layer, there is a mixture of pixels on which an adhesion dot is formed on top of a color dot and pixels on which a color dot is formed on top of an adhesion dot.

Figure 17A:
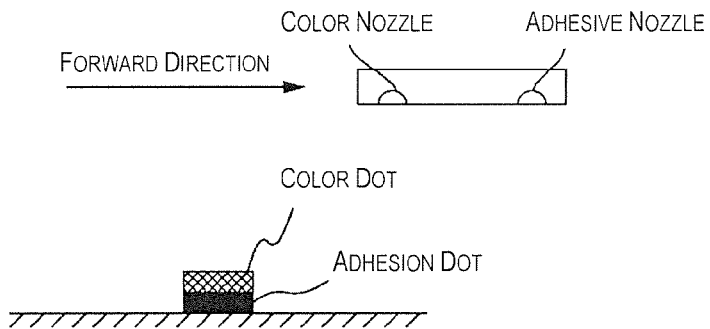
FIGS. 17A and 17B illustrate an overview of a method for forming the mixture layer.
Figure 17B:
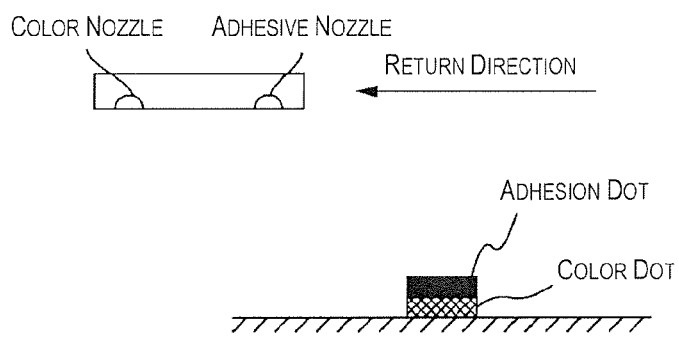

FIGS. 17A and 17B illustrate an overview of a method for forming the mixture layer. During a pass in which the carriage moves in the forward direction, the adhesive nozzle row is positioned on the downstream side, relative to the color nozzle row, with regards to the direction of movement of the carriage; therefore, the color dots are formed on top of the adhesion dots. During a pass in which the carriage moves in the return direction, the color nozzle row is positioned on the downstream side, relative to the adhesive nozzle row, with regards to the direction of movement of the carriage; therefore, the adhesion dots are formed on top of the color dots. Bi-directional recording, in which the carriage performs recording while moving in a reciprocating manner, is thus performed; whereby the mixture layer is formed.

Figure 18:
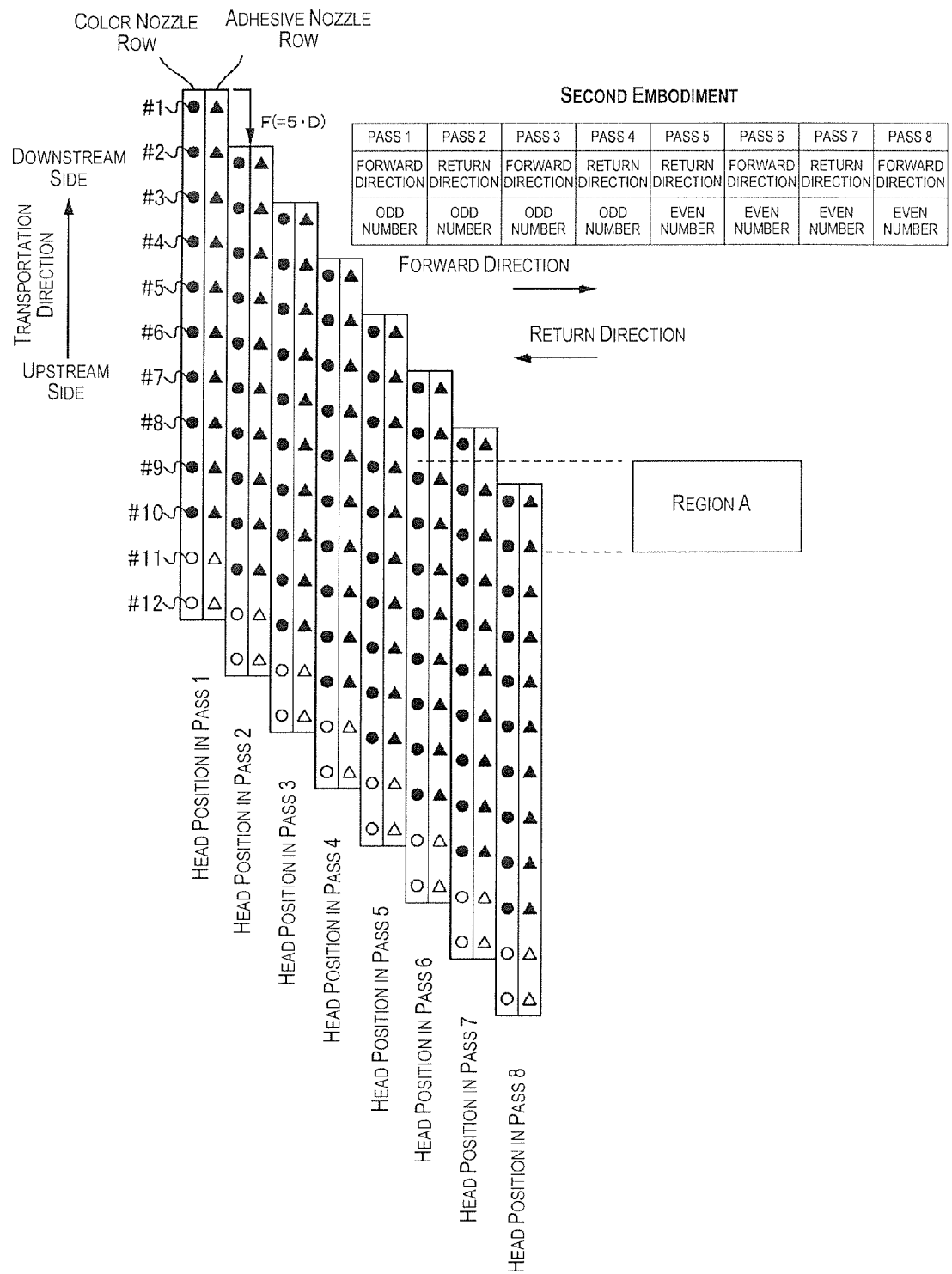
FIG. 18 illustrates a recording method according to the modification example.

FIG. 18 illustrates a recording method according to the modification example. According to this recording method, during every pass, each of the nozzles record dots so that an interval of one dot is inserted after every dot. Then, during another pass, dots are recorded so that another nozzle supplements the intervals between the dots that have been recorded at an interval (i.e., so that the intervals between the dots are filled). Each of the raster lines are thereby recorded using a plurality of nozzles. A recording method of such description is referred to as an "overlap recording method". Here, in a case in which a single raster line is recorded in M passes, M is defined as an overlap number.

In the overlap method, conditions required for recording to be performed at a uniform transportation rate are that (1) N/M is an integer, (2) N/M is in a relatively prime relationship with k, and (3) the transportation rate F is set to (N/M)·D. In FIG. 18, a nozzle row has 12 nozzles arranged in a row along the transportation direction. Since the integer k of the nozzle pitch k×D is equal to 4, in order to satisfy the condition of the overlap method of N/M and k being in a relatively prime relationship with each other, not all nozzles are used; instead, 10 nozzles are used. Also, since 10 nozzles are used, the medium is transported at a transportation rate of 5·D. As a result, e.g., dots are recorded on the medium at a dot interval of 720 dpi (=D) using a nozzle row having a nozzle pitch of 180 dpi (4·D).

As shown in the drawing, bi-directional recording, in which the carriage performs recording while moving in a reciprocating manner, is performed. During passes 1, 3, 6, and 8, the carriage moves in the forward direction; and during passes 2, 4, 5, and 7, the carriage moves in the return direction. As shown in the drawing, during passes 1 through 4, dots are formed on odd-numbered pixels, and during passes 5 through 8, dots are formed on even-numbered pixels.

Figure 19:
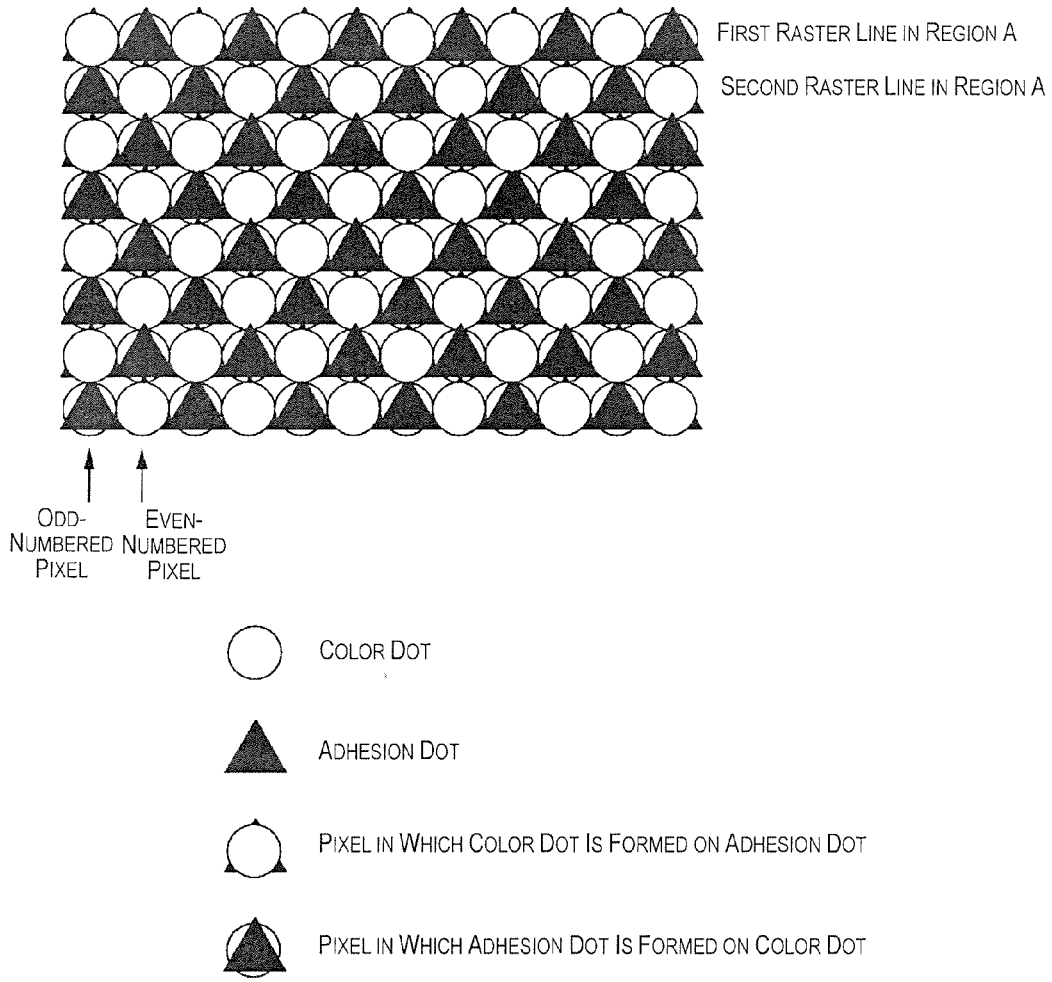
FIG. 19 illustrates the scheme of dots for 8 raster lines in region A shown in FIG. 18.

FIG. 19 illustrates the scheme of dots for 8 raster lines in region A shown in FIG. 18. In the drawing, the color dots are represented by white circles, and the adhesion dots are represented by black triangles. The above/below relationship between the color dots and the adhesion dots is represented by an above/below relationship between the white circles and the black triangles. Here, in order to simplify the description, color dots and adhesion dots are formed on all pixels.

Looking at odd-numbered raster lines as counted from the top of region A, dots are formed on odd-numbered pixels during a pass in which the carriage moves in the forward direction, and dots are formed on even-numbered pixels during a pass in which the carriage moves in the return direction. For example, in the first raster line as counted from the top of region A, dots are formed on odd-numbered pixels by nozzle no. 9 during pass 1, in which the carriage moves in the forward direction; and dots are formed on even-numbered pixels by nozzle no. 4 during pass 5, in which the carriage moves in the return direction. As a result, in the odd-numbered raster lines as counted from the top of region A, a color dot is formed on top of an adhesion dot on odd-numbered pixels, and an adhesion dot is formed on top of a color dot on even-numbered pixels.

Looking at even-numbered raster lines as counted from the top of region A, dots are formed on odd-numbered pixels during a pass in which the carriage moves in the return direction, and dots are formed on even-numbered pixels during a pass in which the carriage moves in the forward direction. For example, in the second raster line as counted from the top of region A, dots are formed on odd-numbered pixels by nozzle no. 8 during pass 2, in which the carriage moves in the return direction; and dots are formed on even-numbered pixels by nozzle no. 3 during pass 6, in which the carriage moves in the forward direction. As a result, in the odd-numbered raster lines as counted from the top of region A, an adhesion dot is formed on top of a color dot on odd-numbered pixels, and a color dot is formed on top of an adhesion dot on even-numbered pixels.

Thus, in region A, in all raster lines, pixels on which dots are formed during a pass in which the carriage moves in the forward direction and pixels on which dots are formed during a pass in which the carriage moves in the return direction are arranged in a row along the movement direction in an alternating manner. As a result, in all raster lines, a pixel in which an adhesion dot is formed on top of a color dot is positioned between pixels on which a color dot is formed on top of an adhesion dot. In other words, in all raster lines, there exists a mixture of pixels on which an adhesion dot is formed on top of a color dot and pixels on which a color dot is formed on top of an adhesion dot.

According to the modification example, it is possible to form a mixture layer made up from the color ink and the adhesive fluid, whereby the adhesion performance between the color ink and the protective layer on the transfer medium is enhanced, and it is possible to suppress any separation between the color ink and the protective layer during transfer.

Second Modification Example

According to the aforementioned embodiment, an edge extraction process is performed as shown in FIG. 8 when the region of the adhesion image is automatically set in S104. However, the method for automatically setting the region of the adhesion image is not limited to that described. For example, it is also possible to use an expansion process described below to automatically set the region of the adhesion image.

Figure 20A:
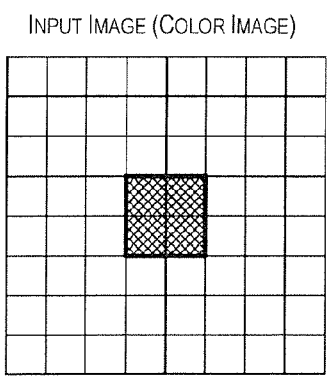
FIGS. 20A and 20B illustrate the expansion process.
Figure 20B:
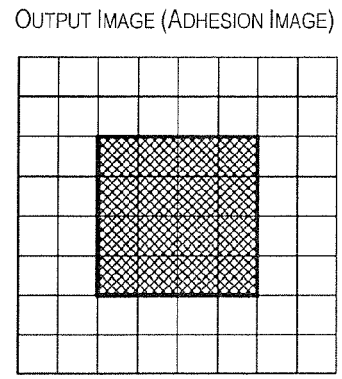

FIGS. 20A and 20B illustrate the expansion process. An expansion process is a process for enlarging the image by a predetermined number of pixels. Specifically, in the expansion process, the following process is performed when Fij is an input image and Gij is an output image.

(A) If data for a pixel F(i, j) of the input image Fij or any of 8 neighboring pixels is not 0, the pixel G(i, j) of the output image Gij is to be within the region of the adhesion image.

(B) In instances other than the above-mentioned (A), the pixel G(i, j) of the output image Gij is to be outside the region of the adhesion image. (If the pixel F(i, j) of the input image Fij and all of 8 neighboring pixels is 0, the pixel G(i, j) of the output image Gij is to be outside the region of the adhesion image).

This expansion process causes the region of the adhesion image to be one that is larger than the color image. As a result, adhesion dots are formed on the transfer medium so as to be adjacent to the color dots, enhancing the transfer performance of the color image. A process other than the expansion process may be used to set the region of the adhesion image to be larger than the region of the color image. In such a case, again, the adhesion dots are formed on the transfer medium so as to be adjacent to the color dots, enhancing the transfer performance of the color image.

Third Modification Example

In the aforementioned embodiment, the resolution of the color image and the resolution of the adhesion image are identical. However, this is not provided by way of limitation.

FIGS. 21A and 21B illustrate the resolution of the color image and the resolution of the adhesion image. The color image in FIG. 21A has a resolution of 720×720 dpi, whereas the adhesion image in FIG. 21B has a resolution of 360×360 dpi.

FIG. 21C illustrates color dots and adhesion dots formed according to the image data of FIGS. 21A and 21B. The color dots are formed at 1/720-inch intervals, whereas the adhesion dots are formed at 1/360-inch intervals. It is thus possible to form the color dots and the adhesion dots in an overlapping manner, even if the respective resolution of the two images is different.

Nevertheless, in a case of this modification example, it is preferable that the adhesion dots are larger than the color dots. As shown in the drawing, in a case in which the respective resolution of the two images is different by a factor of two, it is preferable that an adhesion dot has a size corresponding to 4 pixels in the color image. In a case in which a color dot is to be formed on any of 4 pixels (2×2 pixels) in the color image, it is preferable that the adhesion image is generated so that an adhesion dot is formed at this position. Put otherwise, pixel data for a single pixel in the adhesion image may be generated on the basis of a logical sum of pixel data for 4 pixels in the color image. The adhesive fluid is thereby inevitably applied to a region to which the color ink has been applied.

Other

The aforementioned embodiment has been described primarily in relation to a recording device (an inkjet printer); it shall be apparent that disclosure of a printing device, a printing method, a program, a storage medium storing a program, and the like is included therein.

The aforementioned embodiment has been described in order to facilitate understanding of the present invention, and is not provided by way of limitation with regards to the interpretation of the present invention. It shall be apparent that the present invention can be modified or improved without departing from the scope thereof, and that the present invention includes an equivalent thereof. In particular, an embodiment described below is also included in the present invention.

Nozzle

In the aforementioned embodiment, a piezoelectric element is used to discharge ink. However, the method for discharging a liquid is not limited to that described. For example, another method, such as one in which heat is used to generate bubbles in the nozzles, can also be used.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A control device adapted to control a recording device provided with a nozzle for discharging a color ink and a nozzle for discharging an adhesive fluid, the control device comprising:
   a color image data generating part configured to generate color image data representing a color image made up from color dots formed by the color ink; and
   an adhesion image data generating part configured to generate adhesion image data representing an adhesion image made up from adhesion dots formed by the adhesive fluid, the adhesion image data being generated such that the adhesion dots are arranged so that the adhesive fluid is applied at an amount that corresponds to an amount of the color ink applied per unit area and the adhesion dots are arranged so that, when the amount of the color ink applied per unit area is zero, the amount of the adhesive fluid applied differs between inside and outside of a region of the adhesion image.

2. The control device according to claim 1, wherein
   the recording device causes the color dots to be formed on a base material according to the color image data, and causes the adhesion dots to be formed on the base material according to the adhesion image data, whereby the recording device causes a transfer medium to be manufactured.

3. The control device according to claim 1, wherein
   the adhesion image data generating part is configured to use the color image data as a basis and to further add a pixel, in which a dot is to be formed, to generate the adhesion image data.

4. The control device according to claim 1, wherein
   the adhesion image data generating part is configured to generate the adhesion image data so that, inside the region of the adhesion image, a proportion of the amount of the adhesive fluid applied relative to the amount of the color ink applied increases as the amount of the color ink applied per unit area decreases.

5. The control device according to claim 1, wherein
   the region of the adhesion image is set to a larger range than a region of the color image.

6. A method for manufacturing a transfer medium comprising:
   generating color image data representing a color image made up from color dots formed by color ink; and
   generating adhesion image data representing an adhesion image made up from adhesion dots formed by an adhesive fluid, the adhesion dots being arranged so that the adhesive fluid is applied at an amount that corresponds to the amount of the color ink applied per unit area and the adhesion dots are arranged so that, when the amount of the color ink applied per unit area is zero, the amount of the adhesive fluid applied differs between inside and outside of a region of the adhesion image.

7. A non-transitory computer-readable storage medium having stored thereon instructions executable by a computer to control a device, which applies a color ink and an adhesive fluid to a base material and manufactures a transfer medium, to perform a method for manufacturing a transfer medium comprising:
   generating color image data representing a color image made up from color dots formed by color ink; and
   generating adhesion image data representing an adhesion image made up from adhesion dots formed by an adhesive fluid, the adhesion dots being arranged so that the adhesive fluid is applied at an amount that corresponds to the amount of the color ink applied per unit area and the adhesion dots are arranged so that, when the amount of the color ink applied per unit area is zero, the amount of the adhesive fluid applied differs between inside and outside of a region of the adhesion image.

* * * * *